United States Patent Office 2,799,713
Patented July 16, 1957

2,799,713

METHOD OF MAKING TRICHLOROPHENOLS FROM TETRACHLOROBENZENES

Alexander H. Widiger, Jr., Midland, Mike L. Aaron, Hemlock, and Gordon F. Dugan, Beaverton, Mich., assignors to The Dow Chemical Company, Midland, Mich., a corporation of Delaware No Drawing. Application January 24, 1955,
Serial No. 483,798

5 Claims. (Cl. 260—623)

This invention concerns an improved process for hydrolyzing tetrachlorobenzenes to produce trichlorophenols. It relates more particularly to improvements in a process for carrying out the hydrolysis of a tetrachlorobenzene to produce a trichlorophenol.

United States Patent No. 2,615,923 forms trichlorophenols by reacting tetrachlorobenzenes with an alkali metal hydroxide dissolved in, or mixed with, methyl alcohol at elevated temperatures and pressures. U. S. Patent No. 2,509,245 makes 2,4,5-trichlorophenol by heating 1,2,4,5-tetrachlorobenzene at temperatures between 170° and 190° C. at atmospheric to 20 pounds pressure with an alkali metal hydroxide dissolved in, or mixed with ethylene glycol or propylene glycol.

There are several objections to the methods heretofore proposed for the preparation of trichlorophenols from tetrachlorobenzenes particularly when applied to the alkaline hydrolysis of tetrachlorobenzenes to produce trichlorophenols on a commercial scale. The principal disadvantage is that of employing an organic liquid or solvent in the hydrolysis reaction. The employment of an organic liquid in the hydrolysis results in the formation of byproduct ethers and increases the problems of separation and recovery of the final product.

When methyl alcohol is employed in the hydrolysis considerable quantities of the alcohol are consumed in forming ethers, e. g. dimethylether, or methyl ether of trichlorophenol, and the alcohol must be replaced by new supplies. The employment of a glycol in the reaction increases the problems of separation and recovery of the final product. Also, the employment of an organic liquid or solvent in the hydrolysis takes up valuable reactor space and lowers the capacity for reactants of a given reaction vessel, is expensive and adds to the cost of the final product.

It has now been found that a tetrachlorobenzene having the empirical formula $C_6H_2Cl_4$, e. g. 1,2,4,5-tetrachlorobenzene, or a mixture of isomeric tetrachlorobenzenes, can readily be hydrolyzed, whereby a single chlorine atom is replaced by a hydroxyl group or the corresponding metaloxy group to produce trichlorophenols or salts thereof in good yield, by heating the tetrachlorobenzene in admixture with an alkali metal hydroxide and water at elevated temperatures and pressures as hereinafter described.

More specifically, it has been discovered that the alkaline hydrolysis of tetrachlorobenzenes to produce trichlorophenols in good yield can readily be carried out under the following set of reaction conditions: (a) carrying out of the hydrolysis reaction at temperatures between 225° and 300° C., preferably from 240° to 280° C.; (b) employing the alkali metal hydroxide in amount corresponding to from 1.8 to 4.5, preferably from 2 to 4, gram molecular proportions of the alkali metal hydroxide per gram molecular equivalent proportion of the tetrachlorobenzene and in admixture with sufficient water to form an aqueous solution containing from 2 to 10, preferably from 2 to 8, percent by weight of the alkali metal hydroxide; and (c) carrying out of the hydrolysis under a pressure at least as high as the autogenous pressure of the mixture of materials. The hydrolysis is carried out in a reaction time of not more than 120 minutes, preferably from about 6 to 90 minutes.

The invention concerns a process for hydrolyzing tetrachlorobenzenes which involves employing each of the reaction conditions set forth in items (a), (b) and (c) just mentioned and results in good yields of trichlorophenols. The invention utilizes a readily available, inexpensive, non-flammable reaction medium, and permits carrying out of the alkaline hydrolysis of tetrachlorobenzenes to produce trichlorophenols in a manner suitable for the manufacture of trichlorophenols, batchwise, or in continuous manner, on an economically commercial scale.

Sodium hydroxide is the preferred alkali metal hydroxide to be employed in the hydrolysis. Other alkali metal hydroxides such as potassium hydroxide, or lithium hydroxide, or mixtures of any two or more alkali metal hydroxides can be used.

The alkali metal hydroxide is employed in amount corresponding to from 1.8 to 4.5, preferably from 2 to 4 gram molecular proportions per gram molecular equivalent proportion of the tetrachlorobenzene employed, and in admixture with sufficient water to form an aqueous solution of the alkali metal hydroxide in from 2 to 10, preferably from 2 to 8, percent by weight concentration.

The hydrolysis is carried out with agitation at temperatures between 225° and 300° C., preferably from 240° to 280° C., and under a pressure at least as high as the autogenous pressure of the mixture of the materials. Pressures of from about 400 to 1500 pounds per square inch are satisfactory and pressures of from 400 to 3000 pounds per square inch gauge, or higher can be used.

The hydrolysis proceeds readily under the aforementioned reaction conditions to produce the trichlorophenols or salts thereof in appreciable yield in a reaction time of from about 6 to 120 minutes. The rate at which the reaction occurs is dependent in part upon the concentration of the alkali metal hydroxide in the aqueous starting solution and the reaction temperature employed, within the ranges here specified. The degree of hydrolysis is dependent upon the reaction time, under otherwise similar reaction conditions. At the higher reaction temperatures, e. g. 250° to 300° C., herein specified, the hydrolysis reaction proceeds to completion at a faster rate and in a shorter time than at lower temperatures. The mixture of materials should not be heated at the reaction temperatures herein specified for prolonged periods of time such as to result in the removal of more than one chlorine atom from a molecule of the tetrachlorobenzene starting material, or result in deterioration of the trichlorophenol product.

In practice, the tetrachlorobenzene, the alkali metal hydroxide and water, or an aqueous solution of the alkali metal hydroxide, are placed in a suitable pressure resistant vessel, e. g. an iron, steel, or stainless steel autoclave, in the desired proportions. The mixture is agitated and heated at reaction temperatures between 225° and 300° C. under at least the autogenous pressure of the mixture of materials for a reaction time of from about 6 to 120 minutes, then cooled. The hydrolysis mixture is removed from the reactor. In the instance where the tetrachlorobenzene starting material, e. g. 1,2,4,5-tetrachlorobenzene, is a crystalline material at ordinary temperatures the unreacted tetrachlorobenzene is usually recovered by filtering the hydrolysis mixture. The filtrate, or aqueous hydrolysis liquor containing the trichlorophenol in the form of its alkali metal salt, is thereafter acidified with an acid such as sulfuric acid, or hydrochloric acid, preferably the latter. The trichlorophenol is separated from the aqueous liquor in usual ways, e. g. by decanting or filtering if the product is a solid, or by extraction of the aqueous acidic liquor with a water-immiscible solvent such as benzene, toluene, or chlorobenzene to dissolve the trichlorophenol. The trichlorophenol is recovered from the solvent in usual ways, e. g. by distillation.

The hydrolysis of the tetrachlorobenzene can be carried out in continuous manner by feeding the tetrachlorobenzene and a solution of the alkali metal hydroxide and water in the desired proportions to a reaction zone, e. g. a tubular reactor or other suitable pressure resistant vessel, wherein the materials are agitated and heated in admixture with one another under pressures at least as high as the autogenous pressure and at temperatures and for reaction times as previously described, and thereafter cooling and discharging the hydrolyzed mixture from the reaction zone, after which the trichlorophenol product is recovered in usual ways.

The following examples illustrate ways in which the principle of the invention has been applied but are not to be construed as limiting its scope.

EXAMPLE 1

A charge of 113.4 grams (0.525 mole) of 1,2,4,5-tetrachlorobenzene having a freezing point of 138° C., 42 grams (1.05 moles) of sodium hydroxide and 900 cc. of water, was placed in an iron bomb. The mixture was agitated and heated at a temperature of 250° C. under the autogenous pressure of the mixture of materials for a period of 20 minutes, then cooled. The bomb was opened and the contents removed. The mixture was filtered to recover the unreacted 1,2,4,5-tetrachlorobenzene, which was washed with water and dried. There was obtained 38.3 grams of unreacted 1,2,4,5-tetrachlorobenzene. The conversion was 66 percent, based on the tetrachlorobenzene starting material. The filtrate, i. e. the aqueous hydrolysis liquor, was acidified with dilute hydrochloric acid. The acidic mixture was extracted three times, each with a 100 cc. portion of benzene, and the benzene solutions combined. The solution was distilled to separate the components. There was obtained 56.3 grams (0.28 mole) of 2,4,5-trichlorophenol having a freezing point of 63.5° C. and 1.8 grams of residue. The yield of 2,4,5-trichlorophenol product is 80.5 percent, based on the 1,2,4,5-tetrachlorobenzene consumed in the reaction.

EXAMPLE 2

In each of a series of experiments, a charge of 37.8 grams of 1,2,4,5-tetrachlorobenzene (freezing point 131° C.), 14 grams (0.35 mole) of sodium hydroxide and 300 cc. of water was placed in an iron bomb. The mixture was agitated and heated at a temperature and for a reaction time stated in the following table under the autogenous pressure of the materials, then cooled. The reacted materials were removed from the bomb. The mixture was filtered to separate the unreacted tetrachlorobenzene. The filtrate was acidified with aqueous hydrochloric acid and the acidic mixture extracted with benzene to separate the trichlorophenol product from the aqueous liquor. The product was recovered by heating the benzene solution to distill and separate the benzene from the 2,4,5-trichlorophenol. The product was obtained as residue after distillation of the benzene. Table I identifies the experiments and gives the temperature and the time in minutes for which the hydrolysis reaction was carried out. The table gives the percent conversion based on the tetrachlorobenzene starting material. The table also gives the weight in grams of the unreacted 1,2,4,5-tetrachlorobenzene and the weight of the 2,4,5-trichlorophenol product obtained and the yield of said product, based on the 1,2,4,5-tetrachlorobenzene consumed in the reaction.

Table I

| Run No. | Reaction Conditions | | Conversion, Percent | Products | | |
|---|---|---|---|---|---|---|
| | Time, Min. | Temp., °C. | | 1,2,4,5-Tetra-Chloro-Benzene, Gms. | 2,4,5-Trichlorophenol | |
| | | | | | Gms. | Yield, Percent |
| 1 | 120 | 225 | 64 | 13.6 | 18.2 | 82 |
| 2 | 60 | 240 | 73 | 10.4 | 19.2 | 76.8 |
| 3 | 30 | 290 | 80 | 7.5 | 19.8 | 68.5 |
| 4 | 10 | 300 | 81 | 7.6 | 19.4 | 70.5 |

EXAMPLE 3

In each of a series of experiments, a charge of 1,2,4,5-tetrachlorobenzene similar to that employed in Example 2, and sodium hydroxide in proportions corresponding to one gram molecular proportion of the tetrachlorobenzene and two gram molecular equivalent proportions of the sodium hydroxide, and sufficient water to form an aqueous solution of the sodium hydroxide in concentration as stated in the following table, was placed in an iron bomb. The mixture was agitated and heated at a temperature of 275° C. under the autogenous pressure of the materials for a period of 10 minutes, then cooled. The trichlorophenol was recovered from the reacted mixture employing procedures similar to those described in Example 2. Table II identifies the experiments and gives the concentration of the sodium hydroxide in percent by weight in the aqueous starting solution. The table gives the percent conversion, the weight in grams of the recovered 1,2,4,5-tetrachlorobenzene, the weight in grams of 2,4,5-trichlorophenol obtained and the percent yield of said product, based on the 1,2,4,5-tetrachlorobenzene consumed in the reaction.

Table II

| Run No. | Hydrolysis Solution | Conversion, Percent | Products | | |
|---|---|---|---|---|---|
| | Concentration of Sodium Hydroxide in Water, Percent | | 1,2,4,5-Tetra-Chloro-Benzene, Gms. | 2,4,5-Trichlorophenol | |
| | | | | Gms. | Yield, Percent |
| 1 | 2 | 90 | 2.0 | 13.9 | 88.4 |
| 2 | 5.0 | 78 | 9.0 | 20.4 | 78 |
| 3 | 10 | 55 | 40.6 | 23.9 | 53.7 |

EXAMPLE 4

A charge of 43.2 grams of crude tetrachlorobenzenes consisting of 75 percent by weight of 1,2,3,4-tetrachlorobenzene, 18 percent of 1,2,4,5-tetrachlorobenzene and 7 percent of 1,2,4-trichlorobenzene was placed in an iron bomb. A charge of 16 grams of sodium hydroxide and 304 cc. of water were added. The mixture was agitated and heated at a temperature of 250° C. under the autogenous pressure of the materials for a period of 20 minutes, then cooled. The bomb was opened and the contents removed. The reacted materials were extracted with benzene. The aqueous and organic layers were separated. The organic layer was distilled. There was obtained 16.4 grams of unreacted tetrachlorobenzenes. The aqueous hydrolysis liquor was made acidic with hydrochloric acid, then extracted with benzene. The benzene solution was heated to distill the benzene. There was obtained as residue or product 22.8 grams of trichlorophenols. The product was analyzed and found to consist of 65 percent by weight of 2,3,6-trichlorophenol, 18 percent of 2,4,5-trichlorophenol, and 17 percent of 2,3,4-trichlorophenol.

EXAMPLE 5

In each of a series of experiments, a charge of 1,2,4,5- tetrachlorobenzene (freezing point 131° C.) and sodium hydroxide in proportion as stated in the following table, together with sufficient water to form an aqueous 5 weight percent solution of the sodium hydroxide, was placed in an iron bomb. The mixture was agitated and heated at a temperature of 250° C. for a period of 20 minutes, then cooled. The reacted materials were removed from the bomb. The products were recovered employing procedures similar to those described in Example 2. Table III identifies the experiments and gives the gram molecular proportions of 1,2,4,5-tetrachlorobenzene and sodium hydroxide employed in the hydrolysis reaction. The table gives the time and temperature conditions under which the hydrolysis was carried out. The table also gives the percent conversion, based on the tetrachlorobenzene starting material, the yield of 2,4,5-trichlorophenol obtained, based on the 1,2,4,5-tetrachlorobenzene consumed in the reaction, and the freezing point of the trichlorophenol.

*Table III*

| Run No. | 1,2,4,5-Chloro-Benzene, Mole | Sodium Hydroxide, Moles | Reaction Conditions | | Conversion, Percent | 2,4,5-Trichlorophenol | |
|---|---|---|---|---|---|---|---|
| | | | Time, Min. | Temp., °C. | | Yield, Percent | Freezing Point, °C. |
| 1 | 1 | 2 | 20 | 250 | 69 | 80 | 55.7 |
| 2 | 1 | 2.5 | 20 | 250 | 81 | 79 | 56.8 |
| 3 | 1 | 3.0 | 20 | 250 | 84 | 80 | 55.1 |
| 4 | 1 | 4.0 | 20 | 250 | 99 | 79 | 52.8 |

We claim:

1. In a process for making a trichlorophenol by the alkaline hydrolysis of a tetrachlorobenzene, the step which consists in hydrolyzing a tetrachlorobenzene by heating a mixture of one gram molecular proportion of a tetrachlorobenzene, from 1.8 to 4.5 gram molecular equivalent proportions of an alkali metal hydroxide and sufficient water to form an aqueous 2 to 10 weight percent solution of the alkali metal hydroxide, at reaction temperatures between 225° C. and 300° C. under at least the autogenous pressure of the mixture.

2. A process as claimed in claim 1, wherein the alkali metal hydroxide is sodium hydroxide.

3. In a process for making a trichlorophenol by the alkaline hydrolysis of a tetrachlorobenzene, the steps which consist in hydrolyzing 1,2,4,5-tetrachlorobenzene by heating a mixture of one gram molecular proportion of the 1,2,4,5-tetrachlorobenzene, from 1.8 to 4.5 gram molecular equivalent proportions of sodium hydroxide and sufficient water to form an aqueous 2 to 10 weight percent solution of the sodium hydroxide, at reaction temperatures between 225° and 300° C. under at least the autogenous pressure of the mixture of materials for a reaction time of from 6 to 120 minutes, then cooling the mixture and recovering 2,4,5-trichlorophenol from the hydrolyzed mixture.

4. A process as claimed in claim 3, wherein the sodium hydroxide is employed in amount corresponding to from 2 to 4 gram molecular proportions per gram molecular equivalent proportion of the tetrachlorobenzene starting material.

5. In a process for making a trichlorophenol by the alkaline hydrolysis of a tetrachlorobenzene, the steps which consist in hydrolyzing a tetrachlorobenzene by continuously feeding a tetrachlorobenzene and sodium hydroxide dissolved in sufficient water to form an aqueous 2 to 10 weight percent solution of the sodium hydroxide, in proportions corresponding to from 1.8 to 4.5 gram molecular proportions of the sodium hydroxide per gram molecular equivalent proportion of the tetrachlorobenzene, to a reaction zone wherein the materials are heated in admixture with one another at temperatures between 225° and 300° C. under at least the autogenous pressure of the mixture of materials for a reaction time of from 6 to 120 minutes, continuously withdrawing the reacted mixture from said reaction zone, and separating the trichlorophenol from the hydrolyzed mixture.

References Cited in the file of this patent

UNITED STATES PATENTS 2,059,245    Nikawitz et al.  ---------- May 30, 1950

FOREIGN PATENTS 1,049,023    France  ---------------- Aug. 12, 1953
(Corresponding Great Britain, 718,779, Nov. 17, 1954)

OTHER REFERENCES

Hinaji: Chem. Abstracts, vol. 48 (1954), Col. 2774 (1 page).